United States Patent [19]
Cox et al.

[11] Patent Number: 5,318,268
[45] Date of Patent: Jun. 7, 1994

[54] THERMALLY ACTUATED VALVE WITH AMBIENT TEMPERATURE COMPENSATION

[75] Inventors: Donald W. Cox, South Elgin; Thomas E. DeSalvo, St. Charles, both of Ill.; Hooshang Didandeh, Zionsville; Can M. Toksoy, Carmel, both of Ind.

[73] Assignee: Eaton Corporation, Cleveland, Ohio

[21] Appl. No.: 75,156

[22] Filed: Jun. 10, 1993

[51] Int. Cl.⁵ ............................................ F16K 31/02
[52] U.S. Cl. ...................................... 251/11; 60/528; 60/529; 137/468
[58] Field of Search .................. 251/11; 137/468; 60/528, 529

[56] References Cited

U.S. PATENT DOCUMENTS

| | | | |
|---|---|---|---|
| 2,743,574 | 5/1956 | McCorkle | 60/529 |
| 3,203,166 | 8/1965 | Flanagan | 60/528 |
| 3,346,231 | 10/1967 | Wall | 251/11 |
| 3,442,483 | 5/1969 | Schwartz | 251/11 |
| 3,750,999 | 8/1973 | Genbauffe | 60/529 X |
| 3,799,495 | 3/1974 | Wonn | 251/11 |
| 4,027,689 | 6/1977 | Wolfe | 137/68 R |
| 4,053,136 | 10/1977 | Perl | 251/11 |
| 4,067,539 | 1/1978 | Perl | 251/11 |
| 4,102,496 | 7/1978 | Perl | 236/48 R |
| 4,130,265 | 12/1978 | Sakakibara et al. | 251/11 |
| 4,142,553 | 3/1979 | Sakakibara et al. | 251/11 |
| 4,412,650 | 11/1983 | Young et al. | 251/11 X |
| 4,651,968 | 3/1987 | Shopsky | 251/11 |
| 4,681,296 | 7/1987 | Shopsky | 251/11 |
| 4,685,652 | 8/1987 | Shopsky | 251/11 |
| 4,955,583 | 9/1990 | Shopsky | 251/11 |
| 5,037,061 | 8/1991 | Shopsky | 251/11 |

*Primary Examiner*—Stephen M. Hepperle
*Attorney, Agent, or Firm*—R. A. Johnston

[57] ABSTRACT

An electrically operated thermally responsive valve having a bimetal operator arm heated by an electrical resistance heater for deflection to move a resilient poppet between an open and closed position on a valve seat for controlling flow to the valve outlet port. The base or active portion of the bimetal arm is formed of a first bimetal material with linear deflection properties up to 700° F. for valve operation. The outboard end or compensator portion of the bimetal arm is formed of a second bimetal material having linear deflection properties up to 300° F. for ambient compensation, but very low deflection properties at valve heater temperatures in the range 300° F.–700° F. for minimizing overcompensation from heating of the outboard portion due to heat transfer from the active portion.

2 Claims, 2 Drawing Sheets

5,318,268

THERMALLY ACTUATED VALVE WITH AMBIENT TEMPERATURE COMPENSATION

BACKGROUND OF THE INVENTION

The present invention relates to electrically operated thermally actuated valves, and particularly relates to such valves which are employed for controlling the flow of gaseous fluid to a fuel burner. Thermally actuated gas valves are commonly employed in residential heating furnaces and appliances such as cooking ovens, ranges, and clothes dryers.

Thermally actuated gas valves for fuel burners for the aforementioned applications typically employ a resilient poppet mounted on the end of an arm which is deflected to close the poppet against the valve seat for controlling flow to an outlet port. The more common design employed for valves of this type utilizes bimetal material for the deflectable arm; and, an electrical resistance heating coil is energized to heat a portion of the arm to cause the bimetal to deflect as desired for opening and closing the valve.

Heretofore, gas burner valves employing a bimetal arm for mounting the valve poppet have also been configured to have a portion of the poppet arm constructed with the bimetal material reversed to provide deflection in the opposite sense for a given temperature change to thereby neutralize the deflection caused by changes in ambient temperature. Typically, the root or anchored portion of the poppet arm is surrounded by the heating coil and comprises an "active" portion of the poppet arm. The outboard portion of the arm is however, not directly heated by the coil and is therefore capable of providing for ambient temperature compensation if reversed with respect to the active portion. When the heater coil is energized to open the valve, the heated "active" portion of the bimetal self-heats the compensating outboard portion of the bimetal arm and causes undesired overcompensation. If the undesired overcompensation is great enough, the valve can literally be prevented from opening or closed again after being opened while the heater coil remains energized.

Thus it has long been desired to find a way or means to provide ambient temperature compensation for an electrically actuated thermally responsive valve which is not adversely affected by the active heating for opening the valve which is easy to incorporate into the manufacture and assembly of the valve, while maintaining the overall low manufacturing costs commensurate with the bimetal construction of the valve poppet arm.

SUMMARY OF THE INVENTION

The present invention employs a resilient poppet mounted on the end of a cantilevered bimetal blade arm which is spring biased to close the poppet against an annular valve seat provided about an outlet port in an electrically operated valve. The root or base portion of the bimetal arm has an electrical resistance heater wrapped thereabout which, upon energization, causes warpage of the bimetal to deflect the arm and open the poppet from the valve seat. The outboard or free end portion of the bimetal arm has the bimetal material reversed for deflection in an opposite sense for a given temperature change to thereby neutralize thermal response of the arm to changes in ambient temperature, or in other words to provide ambient temperature compensation.

The bimetal material employed for the base or active heated portion of the bimetal arm is composed of bimetal material having a substantially linear deflection response to changes in temperature up to 800° F. to provide control response to heating thereof by the electric resistance heater coil. The outboard or compensator portion of the bimetal arm is composed of bimetallic material having a generally linear temperature response to temperatures up to 300° F. and a substantially non-linear response to changes in temperature above 300° F. The non-linear response of the compensator blade at temperatures above 300° F. thus produces minimal deflection due to heating of the compensator portion of the blade by heat transfer from the active portion of the bimetal arm.

The present invention thus provides for ambient temperature compensation of a bimetal operated thermally responsive electric valve, yet prevents overcompensation thereof by heating of the compensator due to energization of the actuation coil.

DETAILED DESCRIPTION

Figure 1:
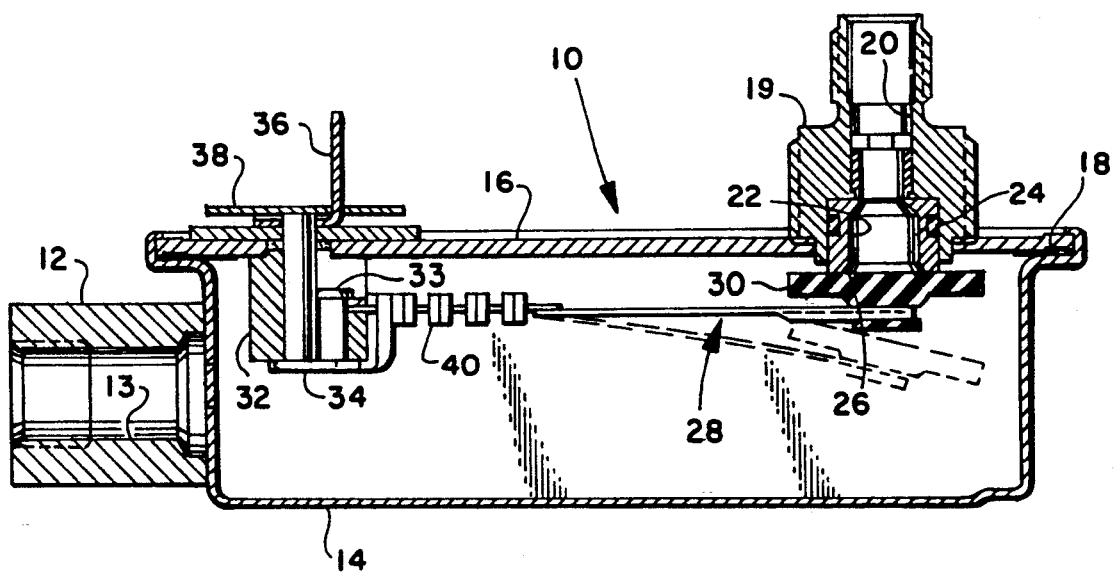
FIG. 1 is a section view of an electrically operated thermally responsive valve employing the present invention.

Referring to FIG. 1, a valve assembly employing the invention is indicated generally at 10 and has an inlet fitting or boss 12 (with an inlet passage 13 communicating with the interior thereof) therein attached to a housing means comprising a shell or can 14. A cover 16 is clamped thereover with a fluid pressure sealing gasket 19 provided therebetween about the periphery thereof. The cover 16 has an outlet fitting 19 attached and sealed thereto as, for example, by welding or brazing. The outlet fitting has a port or passage 20 therethrough which has a valve seat member 22 threaded therein and which is sealed thereabout by a seal ring 24. The valve seat member 22 has an annular seating surface 26 has provided thereon which extends into the interior of the shell or can 14.

An electrically energizable valve operator is disposed within the can 14 and comprises a bimetal arm indicated generally at 28 having a resilient elastomeric poppet 30 mounted on the end thereof, which poppet is seated against valve seat 26 for closing the outlet port 20 as shown in solid outline in FIG. 1. Bimetal arm 28 and poppet 30 are movable between the positions shown in solid outline in FIG. 1 and the position shown in dashed outline for opening and closing the valve upon electrical energization and de-energization, as will hereinafter be described.

The bimetal arm 28 is anchored at one end thereof to an anchor block 32, which preferably comprises an insulator, typically ceramic material, secured to the underside of cover 16 by any suitable expedient as, for example fastening rivet 34. Rivet 34 has an electrical terminal 36 attached thereto on the external side of the cover 16 for electrical connection of the valve. It will be understood that a second rivet 37 (not shown in FIG. 1, but visible in FIG. 2), and a second terminal 38 are provided for connecting the valve to the opposite side of an electrical supply.

Figure 2:
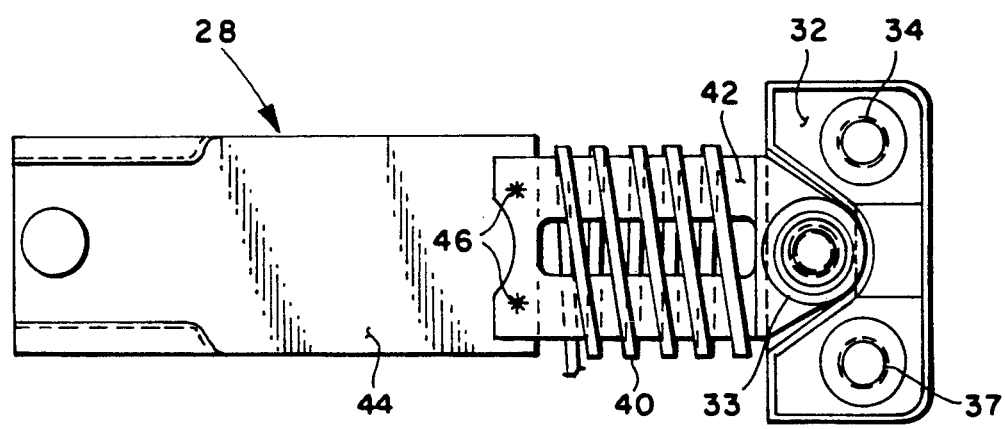
FIG. 2 is a plan or top view of the actuator portion of the valve of FIG. 1.
Figure 3:
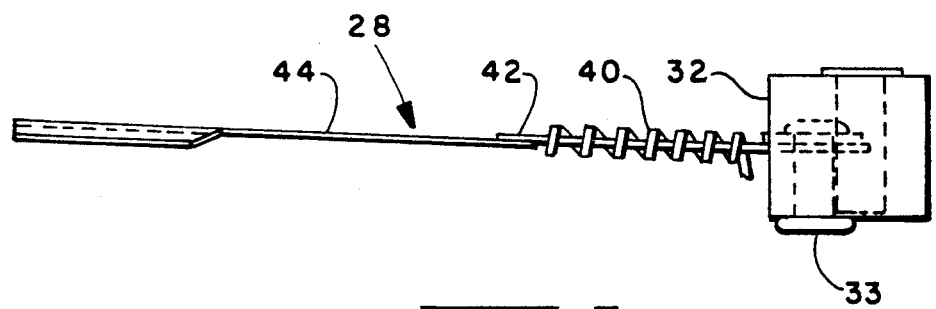
FIG. 3 is a front elevation view of the actuator of FIG. 2.

Referring to FIGS. 1, 2, and 3, an electrical heater means in the form of a resistance wire 40 is provided about the enclosed end of the bimetal arm 28 for providing heating thereof. The root portion of the bimetal arm 28 is a separate member 42 from the outboard portion of the arm 44, which is attached to the root or base member 42 by weldment as denoted by the reference numeral 46 in FIG. 2. The arm member 44 has its bimetal reversed with respect to member 42 that is, the like metals therefor adjoining at the weld joint. It will be understood that this arrangement provides for deflection in an opposite sense for the root member 42 and the outboard member 44 upon the arm experiencing increasing temperature. This technique is well known in the art as a way of providing for ambient temperature compensation of the arm 28. Arm 28 has the base or root portion 42 attached to a recessed area of the block 32 by a suitable expedient such as rivet 33.

Figure 5:
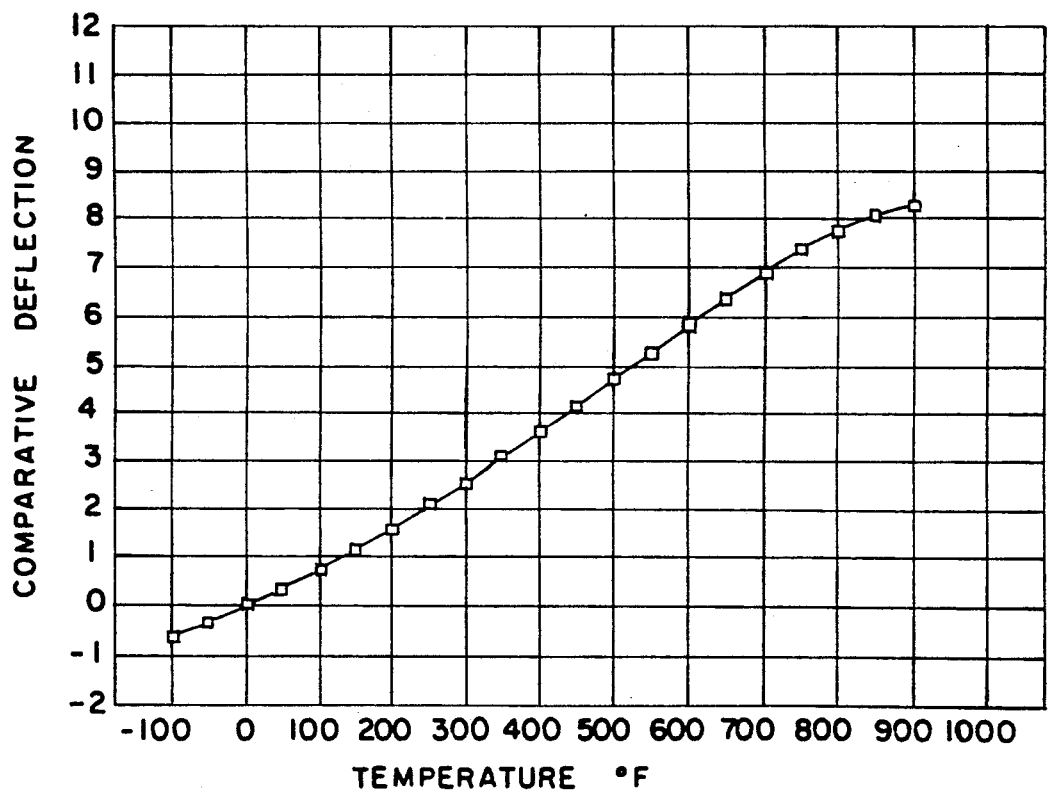

Referring to FIG. 5, a graphical plot of comparative deflection versus temperature for the bimetal material employed for the active or base member 42 of the bimetal arm 28 is illustrated. The plot of FIG. 5 is typical of the material utilized for the member 42 which, in the presently preferred practice comprises a material composed of 60% iron, 35% nickel, and the balance Chromium. The material is available from Chace Precision Metals, Inc., 1704 Barn Street, Reidsville, N.C. 27323-1557, and bears manufacturers type designation number 3500. It will be seen from FIG. 5 that the material for member 42 has a substantially linear coefficient of flexivity over the temperature range 0° F.–700° F., and, according to manufacturer's data is on the order of $8 \times 10^{-6}$ units deflection per degree Fahrenheit.

The material employed for the outboard or compensating member 44 of the bimetal arm 28 is formed of material having preferably a composition of 65% iron, 30% nickel and the balance Chromium, and has a substantially linear flexivity in the region 0° F.–300° F.; whereas, the material of member 44 has a substantially flattened deflection curve at temperatures in the range of 300° F.–400° F. The coefficient of flexivity in the linear range is $13.2 \times 10^{-6}$ units deflection per degree Fahrenheit; and, the material is available from the same source as the material for the active member 42, and has a manufacturer's designation 2600.

Figure 4:
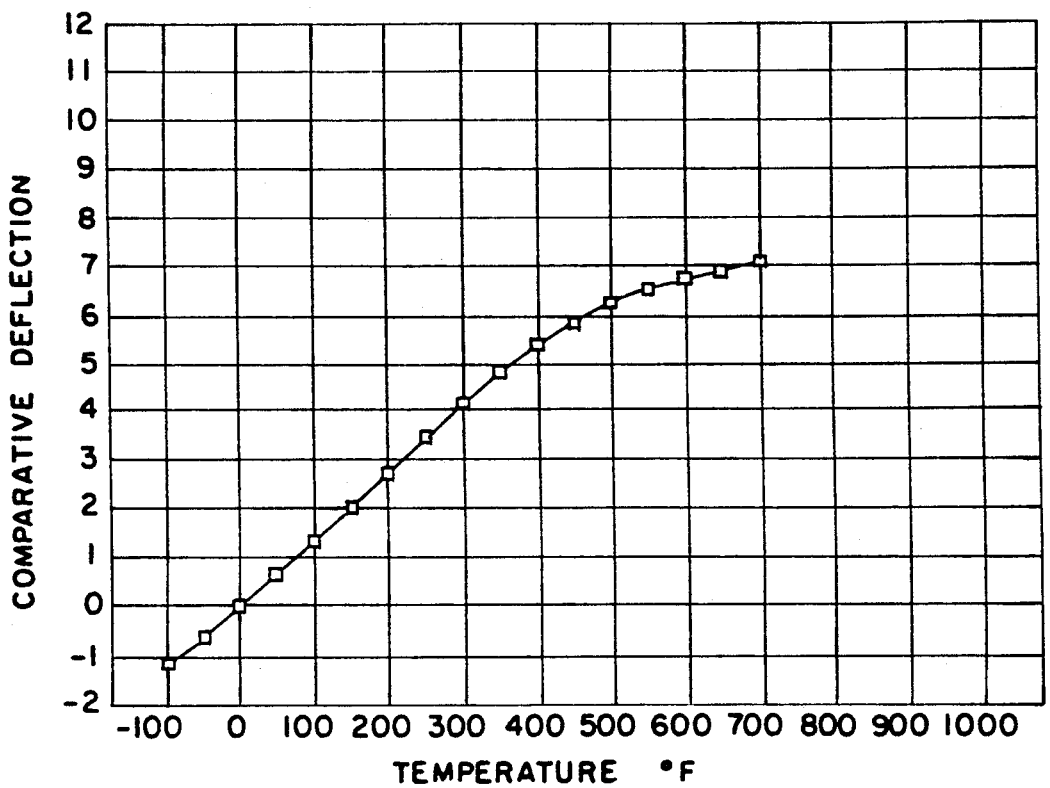
FIG. 4 is a graph of relative deflection versus temperature of the bimetal material employed for the compensator of FIG. 1; and, FIG. 5 is a graph similar to FIG. 4 for the material employed for the active bimetal portion of the valve in FIG. 1.

In operation, as the valve assembly experiences ambient temperatures in the range 0° F.–300° F., the reversed assembly of the bimetal members 42,44 causes the relative deflection of one to be in the opposite direction as the other; and, consequently deflection of the base member 42 of arm 28 in one direction is offset by the relatively longer span of the outboard member 44 which deflects in the opposite direction amounts sufficient to compensate for the accumulated deflection of the root member 42. However, as the temperature exceeds 300° F., the deflection of the outboard member 44 does not increase significantly with increasing temperature as shown in FIG. 4, whereas the root member 42 continues to deflect at a generally constant rate, as shown by the substantially linear plot of FIG. 5. This dual nature of the compensator member 44 thus neutralizes heating of compensator member 44 above ambient when heater coil 40 is energized to heat the base member 42 in the temperature range 300° F.–700° F. for actuation of the valve arm 28.

The present invention thus provides a simplified and low-cost way of compensating a thermally responsive electrically actuated valve so as to provide ambient temperature compensation but neutralizes the effects of heating of the compensator during actuation of the bimetal valve operator.

Although the invention has hereinabove been described with respect to the illustrated embodiments, it will be understood that the invention is capable of modification and variation, and is limited only by the scope of the following claims.

We claim:

1. A thermally actuated valve assembly with ambient temperature compensation comprising:
   (a) housing means defining a valving chamber, an inlet port to said chamber, an outlet port, and a valve seat associated with said outlet port;
   (b) valve means, including a poppet member movable between a position contacting said valve seat for closing said outlet port and a position spaced from said seat for opening said outlet port;
   (c) heater means operable upon electrical energization to heat said valve means for effecting movement between said positions;
   (d) said valve means including an arm member having one end anchored to said housing means and said poppet on the opposite end and having a compensator portion formed of first bimetal material having a substantially constant temperature versus deflection relationship over an operating temperature range 0° F.–300° F. and a second nonconstant temperature versus deflection relationship at temperatures above 300° F.; and,
   (e) said arm member includes an active portion intermediate said compensator portion and the anchored end of said arm, said active portion formed of a second bimetal having a substantially constant temperature versus deflection curve in the temperature range 0° F.–800° F.

2. The valve assembly defined in claim 1, wherein said first bimetal material temperature versus deflection curve is substantially linear in the temperature range 0° F.–300° F.

* * * * *